United States Patent [19]
Yashimoto et al.

[11] 3,781,629
[45] Dec. 25, 1973

[54] SYNCHRONOUS CONTROL SYSTEM ADAPTED FOR A NUMERICALLY CONTROLLED MACHINE

[75] Inventors: Yoshihiro Yashimoto, Tokyo;
Hiroshi Usami, Kawasaki;
Toshiyoshi Okazaki, Tokyo, all of Japan

[73] Assignee: Fujitsu Limited, Kanagawa-ken, Japan

[22] Filed: July 7, 1972

[21] Appl. No.: 269,842

[30] Foreign Application Priority Data
July 7, 1971 Japan.............................. 46/49585

[52] U.S. Cl. .............................................. 318/632
[51] Int. Cl. ......................................... G05d 23/275
[58] Field of Search ...................................... 318/632

[56] References Cited
UNITED STATES PATENTS
2,988,681 6/1961 Bower............................ 318/632 X
3,422,325 1/1969 Gerber et al..................... 318/632 X
3,449,754 6/1969 Stutz................................ 318/632 X

*Primary Examiner*—R. Dobeck
*Attorney*—Allan Ratner

[57] ABSTRACT

Synchronous control system adapted for a numerically controlled machine having a gantry construction is arranged such that a movable part of the machine is given a feeding motion by a pair of feed systems driven by a pair of synchronously controlled pulse operated motors and detecting means separately detect manipulated feed quantities of said pair of feed systems provided for said movable part of the machine. As a function of the differential quantity of the manipulated feed quantities of both feed systems, a compensating means generates compensating pulses which are given to a selected one of the feed systems so that the differential quantity of the manipulated quantities becomes zero and both feed systems are synchronized with each other.

10 Claims, 5 Drawing Figures

3,781,629

SYNCHRONOUS CONTROL SYSTEM ADAPTED FOR A NUMERICALLY CONTROLLED MACHINE

DISCLOSURE OF THE INVENTION

The present invention relates generally to a control system for synchronously driving a machine and more particularly to a control system adapted for synchronously driving and controlling a numerically controlled machine provided with a gantry construction in accordance with numerical command signals supplied from a control unit.

In a numerically controlled machine, e.g. a machine tool or a drafting machine which has a movable part constructed in a gantry form, it is conventional that a pair of feed mechanisms or feed systems provided for a movable part of the machine, such as a table of the machine tool, are driven individually by a couple of drive motors through respective feed shafts of the feed mechanisms. The feed mechanisms then supply the movable part with feed motions along a certain direction. In this case, pulse motors (such as an electric or electro-hydraulic pulse motor) are generally employed for the above drive motors. A couple of pulse operated motors are driven by the same command pulse signals from a control unit. In this way the two pulse operated motors carry out complete synchronous revolutional motions. However, when these synchronous motions of the pulse operated motors are converted into rectilinear motions of the movable part by the respective feed mechanisms, it is impossible to completely eliminate errors such as pitch errors or backlash. This is true since the feed mechanisms have mechanical elements such as gears, screws, and/or pinion-rack mechanisms.

These errors result in generation of static and dynamic errors in synchronization between the respective feed mechanisms. Also the errors in synchronization make the movable part of the machine unable to equally displace along the axial direction. In the end, the positioning error and the following error of the machine are encountered.

However, in the known numerically controlled machine provided with a gantry construction, when the errors in synchronization between both feed mechanisms or systems of feed shafts, come to a predetermined amount only an alarm is emitted. This alarm is to indicate that the operation of the machine must be stopped. However, the errors in synchronization can by no means be eliminated by the machine.

Therefore, the object of the present invention is to provide a synchronous control system capable of eliminating the errors in synchronization between two feed mechanisms, or systems of feed shafts, in a relatively simple manner, upon driving of a numerically controlled machine provided with a gantry construction.

The synchronous control system according to the present invention comprises the following: a detecting means separately detecting manipulated feed quantities of two systems of feed shafts provided for a movable part of a numerically controlled machine; a compensating means for generating compensating pulses as a function of the differential quantity of the manipulated feed quantities of both systems of feed shafts and; a feedback means for carrying out feedback of the compensating pulses to a selected one of either system of feed shafts, so that the selected system follows to the other system whereby the differential quantity of the manipulated feed quantities becomes zero.

The other features and advantages of the present invention will be more apparent from the ensuing description. The preferred embodiments are shown in the accompanying drawings wherein.

Figure 1:
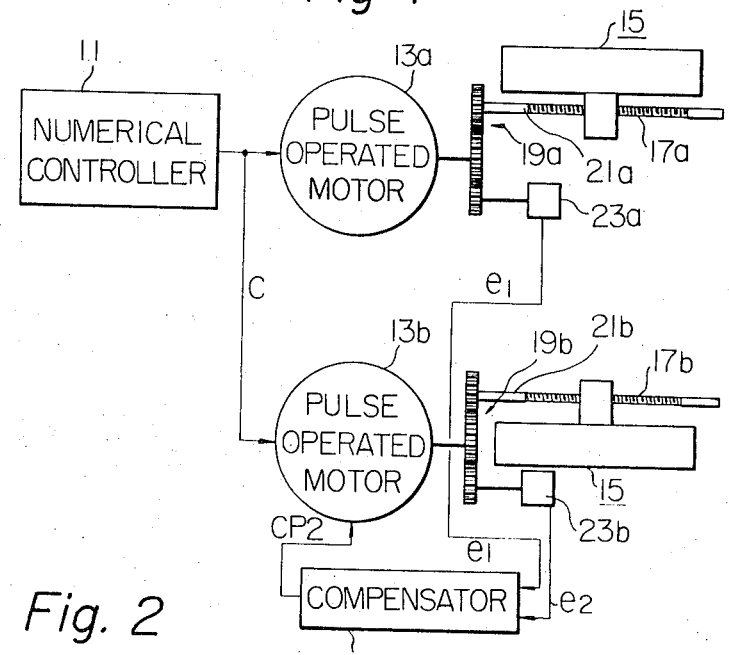
FIG. 1 is a schematic block diagram illustrating an embodiment of the present invention.

FIG. 1 illustrates an embodiment of the control system of the present invention wherein a table of a machine tool provided with two systems of feed shafts, is synchronously controlled. Referring to FIG. 1, command pulse signals C issued by a numerical controller 11 in accordance with a predetermined program, are imparted to pulse operated motors 13a and 13b. The pulse operated motors 13a and 13b, then, carry out synchronized rotational motions by accurately equal quantities commanded by signals C. These rotational motions of both motors 13a, 13b are transmitted to both feed shafts 21a, 21b directed toward the same axial direction, via transmission gears 19a, 19b. These are the respective manipulated feed quantities for a movement of a table 15 of a controlled machine (not shown). Both feed shafts 21a, 21b move the table 15 through respective ball screw mechanisms or pinion-rack mechanism 17a, 17b, in the axial direction.

In this embodiment, the manipulated feed quantities for the table 15 are, respectively, detected by rotary detecting devices 23a, 23b. This is done by detection of the rotational motions of gears 19a, 19b and becomes detected signals $e1$ and $e2$, respectively. These detected signals $e1$ and $e2$ are supplied to a compensator 25. It is noted that known synchros, resolvers, or position coders can be employed for the rotary detecting devices 23a, 23b.

The compensator 25 first operates to compare both signals $e1$ and $e2$ which indicate manipulated feed quantities given to both feed shafts 21a, 21b. After which it generates compensating pulses CP2 in response to positive or negative difference between both signals $e1$ and $e2$, that is to say, as a function of a deviation $(e1 - e2)$. The compensator 25 has an already proposed arrangement as shown in FIG. 2.

Figure 2:
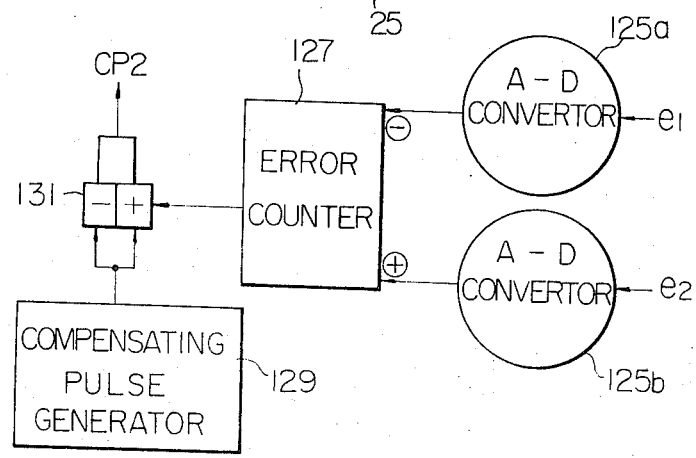
FIG. 2 is a block diagram illustrating an already proposed arrangement of the compensator employed in the system of FIG. 1.

Referring to FIG. 2. The detected signals $e1$ and $e2$ of rotary detecting devices 23a, 23b are imparted to the negative terminal $\ominus$ and the positive terminal $\oplus$ of an error counter 127, after being converted into pulsive signals by analogue-digital converter 125a, 125b. The error counter 127, is constituted by a known reversible counter and discriminates as to whether the deviation $(e1 - e2)$ is positive or negative. The error counter 127 then makes a compensating pulse generator 129 generate positive or negative compensating pulses CP2 through a gate 131, depending upon the discriminated sign and the amount of the deviation $(e1 - e2)$.

Referring again to FIG. 1. Pulse operated motor 13b receiving compensating pulses CP2, carries out compensating revolutional motions so as to drive feed shaft 21b. As a result, table 15 of the machine carries out compensating displacement at its one side by means of mechanism 17b. In the end, the error in synchronization in displacements and velocities produced between two feed mechanisms or two systems of feed shafts 21a, 21b of table 15 can be completely eliminated.

Now, in this embodiment, an open-loop servo system is employed. That is to say, the positioning accuracy of table 15 to the command of numerical controller 11 depends upon the accuracies of ball-screw mechanisms or pinion-rack mechanisms 17a, 17b. Therefore, it is preferred that the mechanisms 17a, 17b are highly accurate so that highly accurate positioning control can be effectuated.

Preferably, also a pulse operated motor with a vernier control circuit is employed for the abovementioned pulse operated motor 13b. Such a preferred motor is so arranged that one compensating pulse corresponds to for example, no more than one tenth of the weight of one command pulse C. As a result, the compensating pulses are able to carry out the compensation of the controlled machine by even displacement units. One unit corresponding to one tenth of the displacement of the machine due to one command pulse C that is, to one tenth of a resolution.

As already proposed, the vernier control circuit has a counter for counting the command pulses and the compensating pulses. The control circuit is arranged to drive a pulse operated motor by normal steps in response to each overflow pulse from the counter according to the counting of the command pulses. With this arrangement the motor may step to every position into which the normal step is divided in response to the content of the counter.

Figure 3:
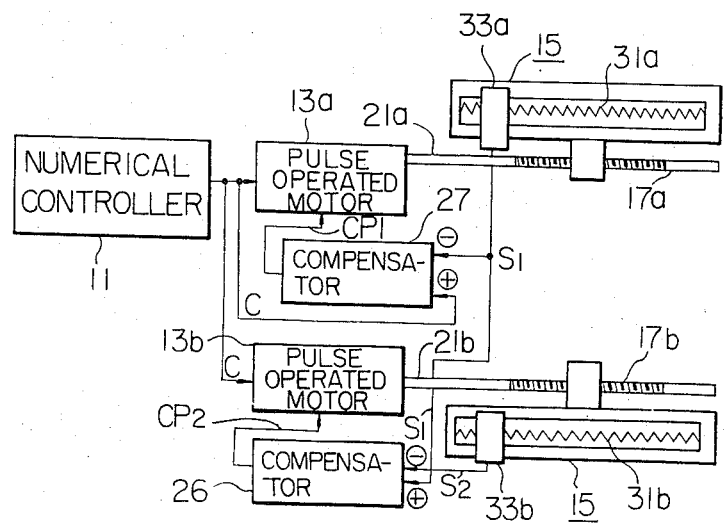
FIG. 3 is a schematic block diagram illustrating another embodiment of the present invention.

FIG. 3 illustrates another embodiment of the synchronous control system of the present invention which differs from that of FIG. 1. In FIG. 3 the amount of actual displacement of table 15 due to the system of feed shaft 21a is detected as the manipulated feed quantity for table 15 by a detecting device. This detecting device is constituted by a scale 31a and a detecting head 33a. The detected signals S1 of the detecting head 33a are supplied to a compensator 27 so that they are compared with the command values (or command signals C). According to the difference between both signals, compensating pulse signals CP1 are generated by the compensator 27. These compensating pulse signals CP1 are fed to pulse operated motor 13a to generate the compensating feed of feed shaft 21a. As a result the displacement of table 15 due to the system of feed shaft 21a is adjusted so as to coincide with the command value C. The actual displacement of table 15 due to the system of feed shaft 21b is similarly detected by a detecting device constituted by a scale 31b and a detecting head 33b as detected signals S2.

It is noted that the known inductosyn or magne-scale can be used for both of the foregoing detecting devices.

In the control system of this embodiment, it will be understood that the above detected signals S2 are arranged to synchronously follow the above detected signals S1. For the purpose of this arrangement, the signals S1 and S2 are supplied to the positive and negative terminals ⊕, ⊖ of the second compensator 26 as shown in FIG. 3. There, the discrimination of the sign of deviation (S1 − S2), which indicates the synchronous error of table 15, is carried out so as to generate compensating pulses CP2. These compensating pulses CP2 make the pulse operated motor 13b produce compensating rotational motions. According to the compensating rotational motions of motor 13b, table 15 is controlled so that the above deviation (S1 − S2) becomes zero. As a result, the displacements of table 15, due to both systems of feed shafts 21a and 21b, not only are synchronized with one another but also coincide with the command value due to command signals C. That is to say, table 15 displaces in one axial direction by the amounts corresponding to the command value due to the feeding operation of both systems of feed shafts 21a and 21b. The second compensator 26 may be arranged according to the same principle as that of FIG. 2, and the arrangement of compensator 27 is shown in FIG. 4.

Figure 4:
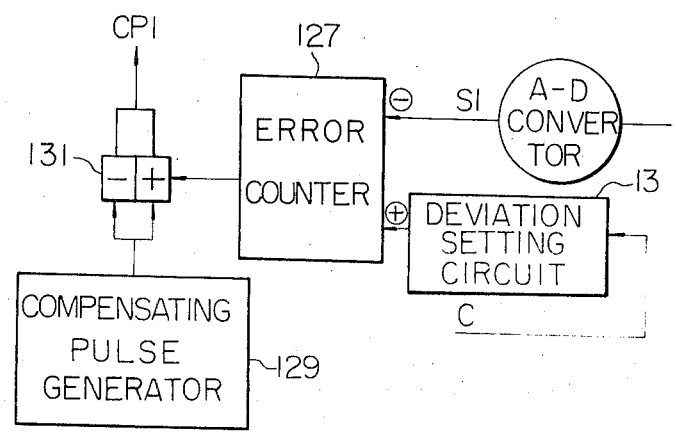
FIG. 4 is a block diagram illustrating an already proposed arrangement of the compensator different from that of FIG. 2 and employed in the system of FIG. 3.

In FIG. 4, detected signals S1 of detecting device 31a, 33a are imparted to the negative terminal ⊖ of an error counter 127 through an Analogue-digital converter 125. At the same time command pulse signals C are imparted to the positive terminal ⊕ of the error counter 127 after an addition of velocity deviation signals thereto through a deviation setting circuit 133. The error counter 127 makes compensating pulse generator 129 generate positive or negative compensating pulses CP1 through gate 131. These pulses correspond to the amount and the sign of the difference between both signals S1, S2. These compensating pulses CP1 are given to pulse operated motor 13a by a feedback means so that the system of feed shaft 21a produces feed motion for compensation.

Figure 5:
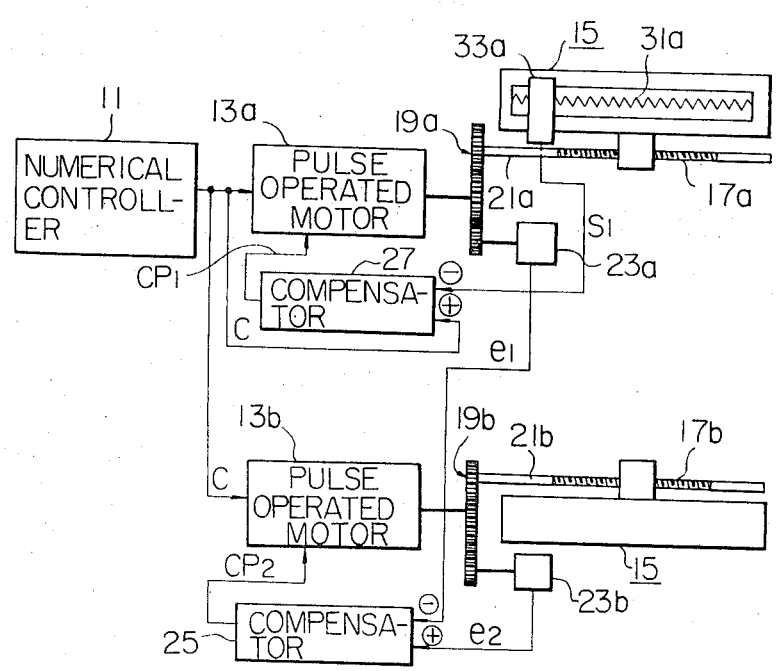
FIG. 5 is a schematic block diagram illustrating a further embodiment of the present invention.

FIG. 5 shows a further embodiment of the present invention. In FIG. 5 each element indicated by the same reference numeral as FIG. 1 and FIG. 3, has the same function as in the case of FIG. 1 and FIG. 3.

It is noted that this embodiment is especially effective when the ball screw mechanisms, or pinion-rack mechanisms, 17a and 17b are made so as to be equally accurate. In the arrangement of this embodiment, expensive detecting device 31a, 33a is provided for only a side of table 15 which is fed by the system of feed shaft 21a. The system of feed shaft 21a is controlled so that detected signals S1, of the detecting device 31a, 33a, coincide with the command value C of numerical controller 11 similar to the previous embodiment of FIG. 3. As is seen from the drawing, gear trains 19a and 19b are arranged between pulse operated motors 13a, 13b and feed shafts 21a, 21b, respectively. Through these gear trains 19a, 19b, manipulated feed quantities e1, e2 in both systems of of feed shafts 21a, 21b are detected by rotary detecting devices 23a, 23b. Then, the deviation (e1 − e2) of both feed quantities e1 e2 is discriminated by compensator 25 with respect to the amount and the sign thereof. Moreover, according to the discrimination, compensating pulse signals CP2 are generated so as to be fed to pulse operated motor 13b. Thus, pulse operated motor 13b, carries out compensating revolutions by which the systems of both feed shafts 21a, 21b are controlled so that the deviation (e1 − e2) becomes zero. That is to say, synchronization between both systems of feed shafts 21a, 21b can be effectuated. As displacement of table 15 due to the system of feed shaft 21a is controlled to coincide with the command value C, displacement of table 15 due to the system of feed shaft 21b also can coincide with the command value C.

It will now be understood that table 15 of the machine is controlled by the synchronous control system of FIG. 5 in order to carry out the displacement just as commanded by numerical controller 11. It is noted that this embodiment has the advantage of an economical arrangement due to the elimination of the expensive detecting device 31b, 33b.

The present invention has been explained with reference to several preferred embodiments thereof. However, it should be understood that the present invention is not limited to these particular applications, and that variants and modification can be effectuated within the scope of the present invention.

What we claim is:

1. A synchronous control system adapted for a numerically controlled machine comprising:
    a first and second movable member of the machine adapted for synchronized movement in displacement and velocity;
    a first motor driving said first movable member along a first axis;
    a second motor driving said second movable member along a second axis;
    a numerical controller for supplying a common command to said first and second motors;
    first detecting means detecting data indicative of the amount of movement of said first movable member;
    second detecting means detecting data indicative of the amount of movement of said second movable member;
    first compensating means connected to said first and second detecting means for generating a compensating signal as a function of the difference in said detected data of both said first and second movable members, and;
    feedback means for providing said compensating signal to said second motor so that the movement of said second movable member follows the movement of said first movable member whereby said difference in said detected data of both said first and second movable members becomes zero.

2. A synchronous control system adapted for a numerically controlled machine as claimed in claim 1 wherein said first and second axes extend in substantially the same direction.

3. A synchronous control system adapted for a numerically controlled machine as claimed in claim 2 wherein said first and second detecting means detect actual displacements of said first and second movable members respectively.

4. A synchronous control system adapted for a numerically controlled machine as claimed in claim 3 wherein said first and second detecting means detect actual rectilinear displacements along said first and second axes as said actual displacements of said first and second movable members.

5. A synchronous control system adapted for a numerically controlled machine as claimed in claim 1 wherein said first and second detecting means detect revolutions supplied from said first and second motors to the feed systems for said first and second movable members.

6. A synchronous control system adapted for a numerically controlled machine as claimed in claim 5 further comprising:
    third detecting means detecting an actual rectilinear displacement of said first movable member along said first axis;
    second compensating means connected to said third detecting means and said numerical controller for generating a further compensating signal as a function of the difference between the command and the actual rectilinear displacement of said first movable member, and;
    second feedback means for providing said further compensating signal to said first motor so that the value of said actual rectilinear displacement of said first movable member becomes identical with said command signal from said numerical controller.

7. A sychronous control adapted for a numerically controlled machine as claimed in claim 1 further comprising:
    second compensating means connected to said first detecting means and said numerical controller for generating another compensating signal as a function of the difference between said data indicative of the amount of movement of said first movable member and said command from the numerical controller, and;
    second feedback means for providing another compensating signal to said first motor so that the amount of movement of said first movable member becomes identical with said command from said numerical controller.

8. A synchronous control system adapted for a numerically controlled machine as claimed in claim 6 wherein said first and second detecting means detect actual displacement of said first and second movable members respectively.

9. A synchronous control system adapted for a numerically controlled machine as claimed in claim 6 wherein said first and second detecting means detect revolutions supplied from said first and second motors to the feed systems for said first and second movable members.

10. A synchronous control system adapted for a numerically controlled machine as claimed in claim 1 wherein said first and second axes along which said first and second movable members of the machine move are directed in the same direction, and further said first and second movable members are physically connected to form a gantry-constructed movable element of said machine.

* * * * *

UNITED STATES PATENT OFFICE
CERTIFICATE OF CORRECTION

Patent No. 3,781,629  Dated December 25, 1973

Inventor(s) Yoshihiro Hashimoto et al

It is certified that error appears in the above-identified patent and that said Letters Patent are hereby corrected as shown below:

In the name of the applicant, change "Yoshihiro Yashimoto" to --Yoshihiro Hashimoto--.

Signed and sealed this 2nd day of July 1974.

(SEAL)
Attest:

EDWARD M. FLETCHER, JR.
Attesting Officer

C. MARSHALL DANN
Commissioner of Patents